United States Patent
Wu et al.

(10) Patent No.: US 8,077,394 B2
(45) Date of Patent: Dec. 13, 2011

(54) GLASS LENS ARRAY MODULE WITH ALIGNMENT MEMBER AND MANUFACTURING METHOD THEREOF

(75) Inventors: Chien-Min Wu, Taipei (TW); Hsueh-Lin Chen, Taipei (TW); Bo-Hao Chang, Taipei (TW); San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/640,670

(22) Filed: Dec. 17, 2009

(65) Prior Publication Data
US 2010/0157428 A1 Jun. 24, 2010

(30) Foreign Application Priority Data
Dec. 18, 2008 (TW) ................ 97149518 A

(51) Int. Cl.
G02B 27/10 (2006.01)
(52) U.S. Cl. ........................ 359/622; 359/621
(58) Field of Classification Search .................. 359/622, 359/621
See application file for complete search history.

(56) References Cited

U.S. PATENT DOCUMENTS

| 6,324,010 | B1 * | 11/2001 | Bowen et al. | 359/622 |
| 6,545,811 | B1 * | 4/2003 | Fujimoto | 359/619 |
| 2010/0027129 | A1 * | 2/2010 | Sato et al. | 359/622 |
| 2010/0284077 | A1 * | 11/2010 | Shyu et al. | 359/503 |

* cited by examiner

Primary Examiner — Ricky Mack
Assistant Examiner — James Jones
(74) Attorney, Agent, or Firm — Muncy, Geissler, Olds & Lowe, PLLC

(57) ABSTRACT

A glass lens array module with alignment fixture and a manufacturing method thereof are revealed. A glass lens array is produced by multi-cavity glass molding and alignment members are arranged on a peripheral of non-optical area of the glass lens array. Optical axis of each of two adjacent glass lens arrays is aligned by corresponding alignment members and the glass lens arrays are assembled by glue. A spacer is disposed between the two adjacent glass lens arrays to form a preset interval if needed. Thus a glass lens array module is formed after curing of the glue. Thereby the alignment of the optical axis of the glass lens is achieved easily and optical precision is also attained. Moreover, the manufacturing processes are simplified and the cost is reduced.

19 Claims, 10 Drawing Sheets

GLASS LENS ARRAY MODULE WITH ALIGNMENT MEMBER AND MANUFACTURING METHOD THEREOF

BACKGROUND OF THE INVENTION

The present invention relates to a glass lens array module and a manufacturing method thereof, especially to a glass lens array module formed by precision assembling of a plurality of glass lens arrays and applied to lenses of LED sources, lenses of solar energy conversion systems, and optical lenses of mobile phones.

Glass precision molding technology has been widely applied to manufacture aspherical molded glass lens with high resolution, good stability and low cost such as lens revealed in US2006/0107695, US2007/0043463, TW095101830, TW095133807, and JP63-295448 etc. A glass preform (or glass material) is set into a mold cavity formed by an upper mold and a lower mold so as to be heating and softening. Then the upper mold and the lower mold are clamped correspondingly and apply pressure on the upper mold and the lower mold so as to make the soft glass perform have the transformed optical surfaces as that of the upper mold and the lower mold. After cooling, a molded glass lens with molding surfaces of the upper mold and the lower mold is produced. In order to reduce manufacturing cost, prior arts—JP63-304201 and US2005/041215 reveal a lens array formed by glass molding. As to a single lens-called a lens element hereunder, JP02-044033 revealed that a lens blank having a plurality of lenses is manufactured by movement of glass materials and multiple molding procedures. Then the lens array is cut into a plurality of lens elements.

The optical lens formed by glass molding is widely applied to assembled lenses of LED light sources, lenses of solar energy conversion systems, and optical lenses of mobile phone cameras with advanced features. The assembled lens or optical lens is formed by a plurality of optical lenses with different lens power arranged with a certain air gap between one another on the optical axis. Thus while assembling, an optical axis of each optical lens must be aligned precisely so as to avoid the reduction of resolution, so called optical precision assembling, rather than the mechanical precision. Moreover, the distance between two adjacent optical lenses (interval of air gap) is fixed. Thus the assembling requires a complicated processes and precise calibration process. Therefore, the yield rate is unable to increase and the cost down is difficult. Since the optical resolution (example as MTF effect) will be affected when the optical assembly having disalignment from optical axis, the lens alignment of the optical lenses is more complicated and important.

As to the manufacturing of the optical lens array, JP2001194508 disclosed a manufacturing method of plastic optical lens array. Taiwanese patent No. M343166 reveals a manufacturing method of glass optical lens array. After being produced, the optical lens array can be cut to form a single optical lens element so as to be assembled in a lens module. Or the optical lens array is assembled with other optical elements to form a lens submodule array that is then cut to form a lens submodule. The lens submodule is assembled with lens holder, image sensors (image capture devices) or other optical elements to form a lens module. In manufacturing of lens module array, wafer level lens modules are revealed in U.S. Pat. No. 7,183,643, US2007/0070511, WO2008011003 and so on. Refer to FIG. 1, a lens module array generally includes an aperture 711, a cover glass 712, a plurality of optical lenses and an infrared (IR) cut lens 717. As shown in figure, the plurality of optical lenses forms a three piece type optical lens set. The optical lens set includes a first optical lens 714, a second optical lens 715 and a third optical lens 716. Two adjacent optical lenses are separated by a spacer 713. After being assembled, a lens module array is formed and then is cut into a plurality of lens modules.

In a lens module array, while assembling a lens array with plurality of optical lenses, the alignment of the lens array has effects on resolution of the lens module. In US2006/0249859, imaging techniques are used to determine if stacked wafers are in proper alignment. Fiducial marks that were previously patterned on each wafer of the stack are exposed in an image produced by the infrared ray. In assembling of plastic optical lens arrays, JP2000-321526 and JP2000-227505 revealed bi-convex type optical lens arrays formed by combination of heights with crevices. As to U.S. Pat. No. 7,187,501, cone-shaped projections are provided on a periphery of a resin lens. A plastic lens array is formed by stacking the resin lens plates one over another through fitting these projections and holes to each other. However, in the conventional assembling way of projections and holes to form plastic optical lens array, material shrinkage after the plastic injection molding will lead to size change (or alignment change) of the projections and the holes. Thus the location precision is affected and the alignment of the optical axis is difficult. Therefore, the applications of the plastic optical lens array is limited, especially during manufacturing of small-size lens module, the complicated processes cause cost increase. The molded glass lens has higher refractive index than the plastic lens and also with better thermostability so that the molded glass has been applied to various optical systems. Moreover, the optical lens array made from molded glass exhibit less shrinkage.

Thus there is a need to develop a method of manufacturing stacked optical glass lens arrays as well as stacked lens modules with simple structure and high precision so as to provide stacked lens modules for assembled lenses of light emitting diode (LED) light sources, assembled lenses of solar energy conversion systems and optical lenses of phone cameras. And the lens modules meet requirements of mass-production and yield rate.

SUMMARY OF THE INVENTION

Therefore it is a primary object of the present invention to provide a glass lens array module that is applied lenses of LED sources, lenses of solar energy conversion systems and optical lenses of mobile phones. The glass lens array module includes at least two glass lens arrays that are glued and fixed with a preset interval. The glass lens array is made by multi-cavity glass molding and having a plurality of optical glass lenses (optical area) as well as non-optical area. Moreover, at least one alignment member such as alignment pin and alignment cavity is disposed on a periphery of the non-optical area. Thus the two glass lens arrays are connected and assembled with each other by the alignment member. And the optical axis of each of the plurality of optical glass lenses of the two glass lens arrays is aligned so as to achieve the precision assembling. A plurality of glass lens arrays can also be overlapped and aligned by the alignment member therebetween so as to form a glass lens array module.

It is another object of the present invention to provide a manufacturing method of a glass lens array module in which the glass manufacturing method is produced by precision assembling of at least two glass lens arrays. The manufacturing method of a glass lens array module includes following steps:

S1: providing a glass blank;

S2: providing a mold of the glass lens array that includes an upper mold and a lower mold which respectively are disposed with a plurality of mold cores for forming optical glass lenses (optical area), and mold pins and/or mold bushings for forming alignment members;

S3: setting the glass blank into the mold cavity formed by upper mold and the lower mold so as to be heated and pressured for carrying out a molding process and molds a glass lens array, the glass lens array having a plurality of optical glass lenses and non-optical area which is arranged with alignment members such as an alignment pin and an alignment cavity;

S4: repeating above steps to produce at least another glass lens array;

S5: coating UV-curing glue on non-optical area of two adjacent glass lens arrays;

S6: assembling and aligning the two adjacent glass lens arrays by corresponding alignment members;

S7: curing the glue to produce a glass lens array module.

The shape and amount of the alignment member disposed on the glass lens array are not limited. The alignment pin can be a column or a rectangular prism while the corresponding alignment cavity is a slot with similar shape. Moreover, the alignment pin can be a cone and the corresponding alignment cavity is a conical hole. For the purpose of optical precision assembly, the alignment member is molded simultaneously with the glass lens array along the optical axis of optical elements.

It is a further object of the present invention to provide a glass lens array module with a plurality of optical elements. For convenience of assembling, the alignment member is a through hole that is arranged at location of non-optical area of the glass lens array and the corresponding location of optical element. For the purpose of optical precision assembly, the through hole is molded along with the optical axis. While assembling, the through hole of the glass lens array and the through hole of the optical element are aligned so as to achieve the easy and precision assembling.

A manufacturing method of a glass lens array module with through holes as alignment members includes following steps:

SS1: providing a glass blank;

SS2: providing a mold of a glass lens array having an upper mold and a lower mold respectively disposed with a plurality of mold cores for forming optical glass lenses (optical area), and mold straight leaders and/or mold straight sleeves for forming through holes;

SS3: setting the glass blank into the mold cavity which formed by the upper mold and the lower mold so as to be heated and pressured for carrying out a molding process and molds a glass lens array, the glass lens array having a plurality of optical glass lenses and non-optical area which is arranged with through holes as alignment members;

SS4: repeating above steps to produce at least another glass lens array;

SS5: preparing an assembly fixture disposed with at least one assembly center shaft;

SS6: putting a glass lens array into the assembly fixture and the through hole is inserted by the assembly center shaft for alignment coating glue on the non-optical area of the glass lens array;

SS7: putting another glass lens array into the assembly fixture and the through hole is inserted by the assembly center shaft for alignment; attaching this glass lens array with the previous glass lens array by glue;

SS8: curing the glue and separate the assembly fixture to form a glass lens array module.

Alternatively, the glass lens array module with through holes as alignment members includes an alignment spacer that is disposed with at least one alignment rod. While assembling, the through hole of the glass lens array and the through hole of the optical element are aligned by the alignment rod of the alignment spacer so as to achieve the easy and precision assembling.

When the glass lens array module of the present invention is applied to optical systems, the glass lens array module includes at least two glass lens arrays and other optical elements. The optical element can be a cover glass, an aperture, a spacer, an IR filter, an image sensor, a solar conversion die, a circuit board, etc. The cover glass is made of glass and is covered over the glass lens array module for shading external vapors and dusts. The aperture is a round film for control of light entering the optical area. The spacer is disposed between two adjacent glass lens arrays so as to maintain an air gap therebetween for optical effect. The IR filter is often applied to camera lenses for prevent light from entering. In various lens designs, an outer surface of the glass lens array is generally coated an optical film instead of the IR filter. The image sensor is used to convert light entering the camera lens into image signals and the circuit board is connected with the image sensor for transmitting the image signals. The solar conversion die is applied to solar energy conversion system where the solar light is focused by the glass lens array and converted to electricity that is sent by the circuit board.

DETAILED DESCRIPTION OF THE PREFERRED EMBODIMENT

Embodiment 1

Figure 1:
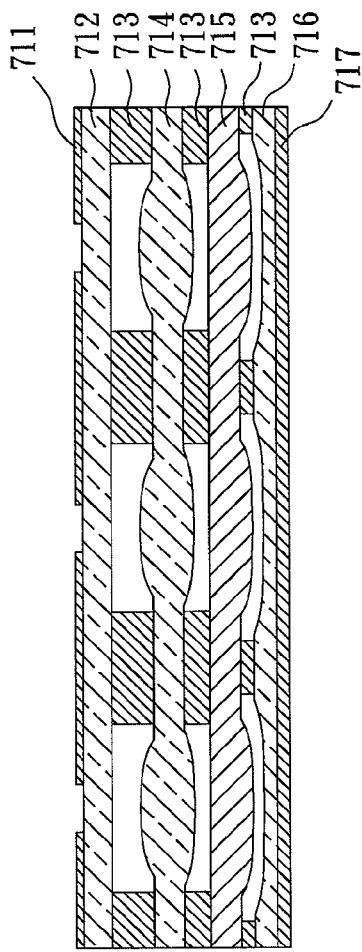
FIG. 1 is a cross sectional view of a conventional glass lens array module.
Figure 2:
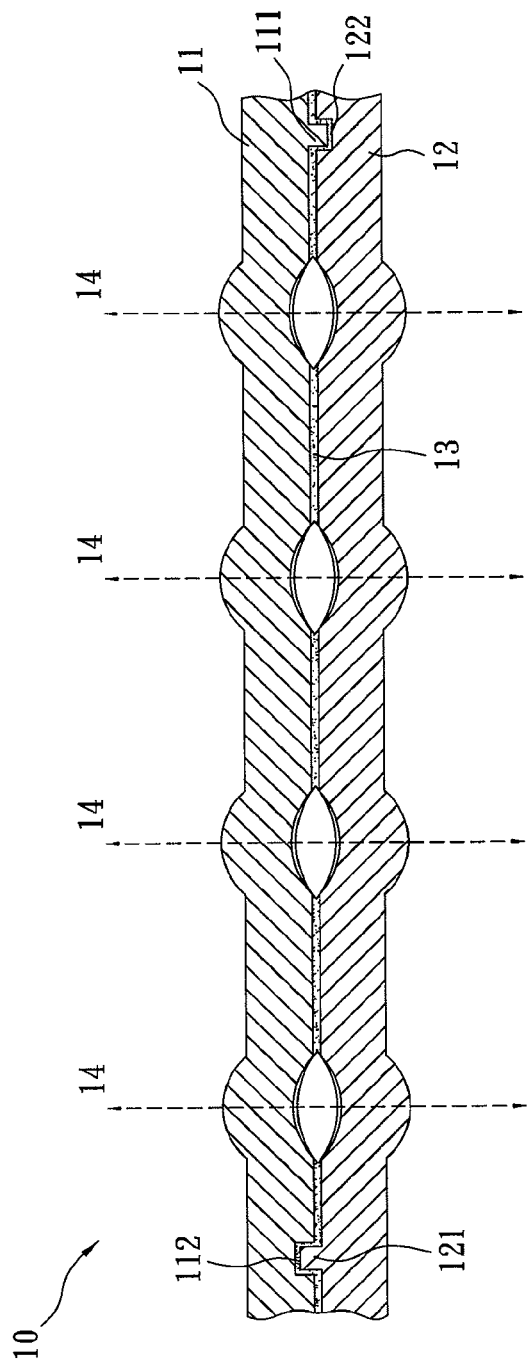
FIG. 2 is a cross sectional view of a glass lens array module according to the present invention.

Refer to FIG. 2, a glass lens array module 10 includes two glass lens arrays 11, 12 and four sets of alignment members (alignment pins 111, alignment cavity 122 and alignment cavity 112, alignment pins 121). The two glass lens arrays 11, 12 are produced by multi-cavity glass molding and having a plurality of optical glass lens (optical area). As shown in FIG. 2, there are four meniscus lenses (optical glass lenses) and non-optical area. The four alignment members are respectively arranged at four corners of non-optical area of the two glass lens arrays 11, 12. There are only two sets shown in FIG. 2, the alignment members include two alignment pins 111 as well as two alignment cavities 112 disposed on the glass lens array 11 and two alignment cavities 122 as well as two alignment pins 121 arranged correspondingly on the glass lens array 12. In this embodiment, the alignment pins 111, 121 are columnar while the alignment cavities 112, 122 are corresponding columnar holes. Because the alignment members having the alignment pins 111, 121 and the alignment cavities 112, 122 respectively are formed simultaneously with the glass lens arrays 11, 12 by the multi-cavity glass molding, the positions of the alignment members and an optical axis 14 of each optical glass lens are fixed and aligned with optical axis. After the two glass lens arrays 11, 12 are assembled and aligned with each other by the alignment members, each optical axis 14 of the two glass lens arrays 11, 12 is assembled within a preset tolerance so as to achieve the precision assembling. In order to fix the assembled glass lens array module 10, glue 13 is coated on the non-optical area of the glass lens array 12 (or the glass lens array 11). In this embodiment, the glue 13 is ultraviolet (UV) curing glue. After being attached with the glass lens array 11 (or the glass lens array 12) and cured the glue 13, a glass lens array module 10 is formed.

Figure 3:
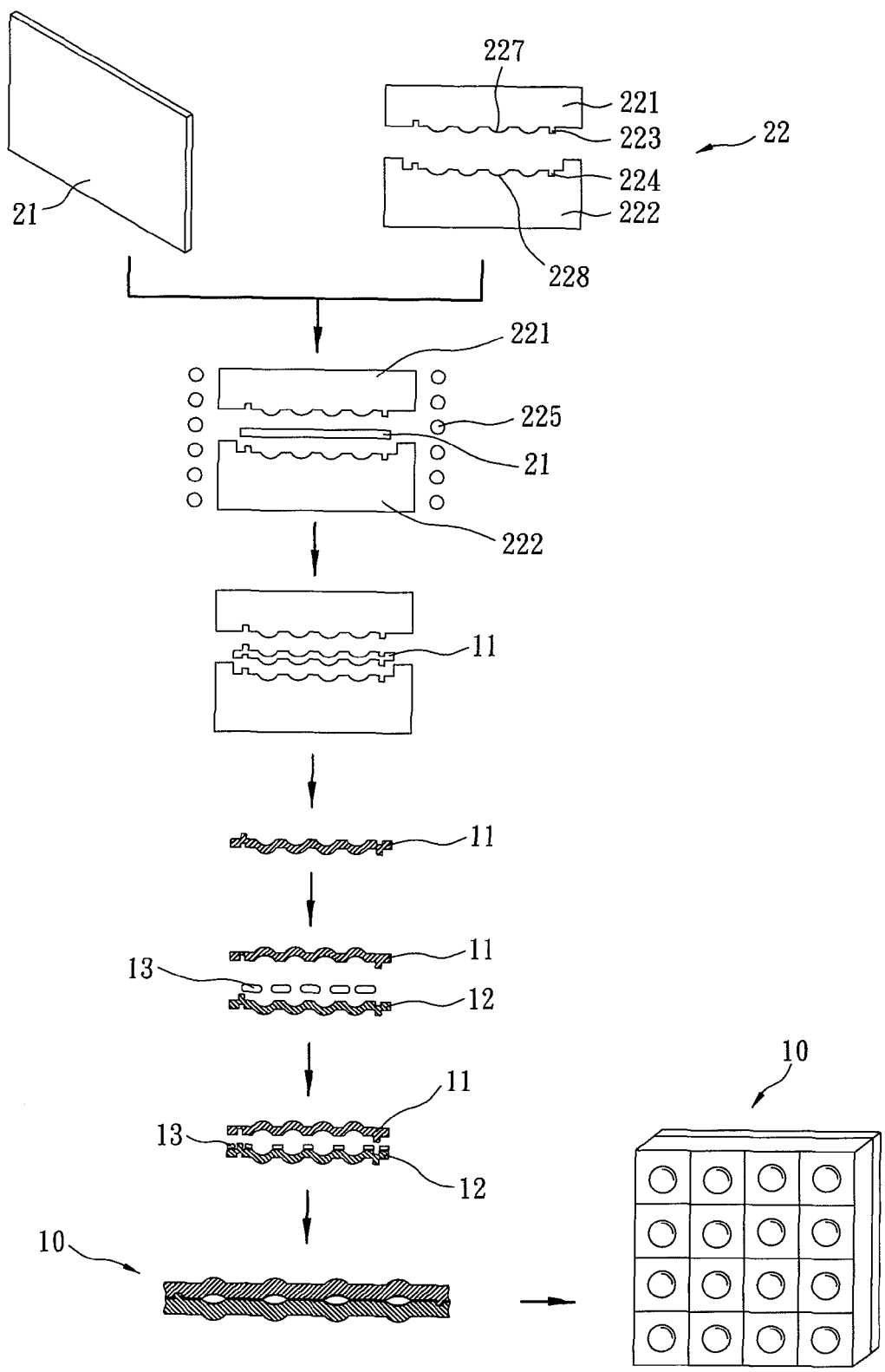
FIG. 3 are schematic drawings showing manufacturing processes of an embodiment according to the present invention.

Refer to FIG. 3, a manufacturing method of glass lens array modules 10 includes following steps:
S1: providing a rectangular plate glass blank 21;
SS2: providing a mold 22 of a glass lens array 11 having an upper mold 221 and a lower mold 222 that are corresponding to each other and respectively disposed with a plurality of mold cores 227, 228 of optical glass lenses and mold pins 223 and/or mold bushings 224 for forming the alignment members;
S3: setting the glass blank 21 into the mold cavity formed by the upper mold 221 and the lower mold 222, so as to be heated by a heater 225 and pressured for carrying out a molding process that transferring the mold cores, mold pins and mold bushings of the upper mold 221 and the lower mold 222 onto the melt glass blank 21 thus the glass lens array 11 with alignment members such as an alignment pin 111 and an alignment cavity 112 is produced;
S4: repeating above steps to produce another glass lens array 12 with alignment members such as an alignment cavity 122 and an alignment pin 121 corresponding to the alignment members of the glass lens array 11;
S5: coating UV-curing glue 13 on non-optical area of the glass lens array 11 or the glass lens array 12;
S6: assembling the two glass lens arrays 11, 12 along an optical axis 14 within a preset tolerance by connecting the alignment pin 111 and alignment cavity 112 respectively with the alignment cavity 122 and alignment pin 121 of the glass lens array 12;
S7: curing the glue 13 by UV radiation to produce a glass lens array module 10.

Embodiment 2

Figure 4:
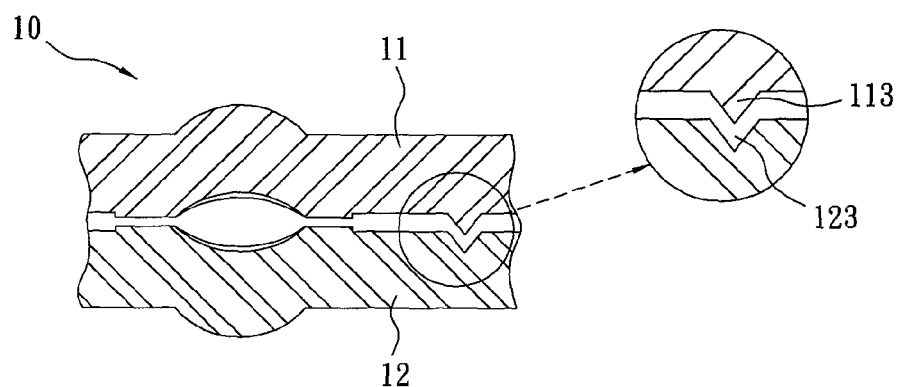
FIG. 4 is a partial cross sectional view of another embodiment with conical alignment members according to the present invention.

Refer to FIG. 4, a glass lens array module 10 of this embodiment consists of two glass lens arrays 11, 12 and four sets of alignment members that each having a conical alignment pin 113 and a conical alignment cavity 123. In the FIG. 4, only one set of alignment member is revealed. The conical alignment pin 113 and the conical alignment cavity 123 respectively are formed simultaneously with a non-optical area of the glass lens array 11 and of the glass lens array 12. After assembling the two glass lens arrays 11, 12 each optical axis is aligned and fixed by glue. Besides a conical mold pin and a conical mold bushing disposed on the mold 22, the manufacturing method and assembling way of this embodiment are similar to those of the embodiment one.

Embodiment 3

Figure 5:
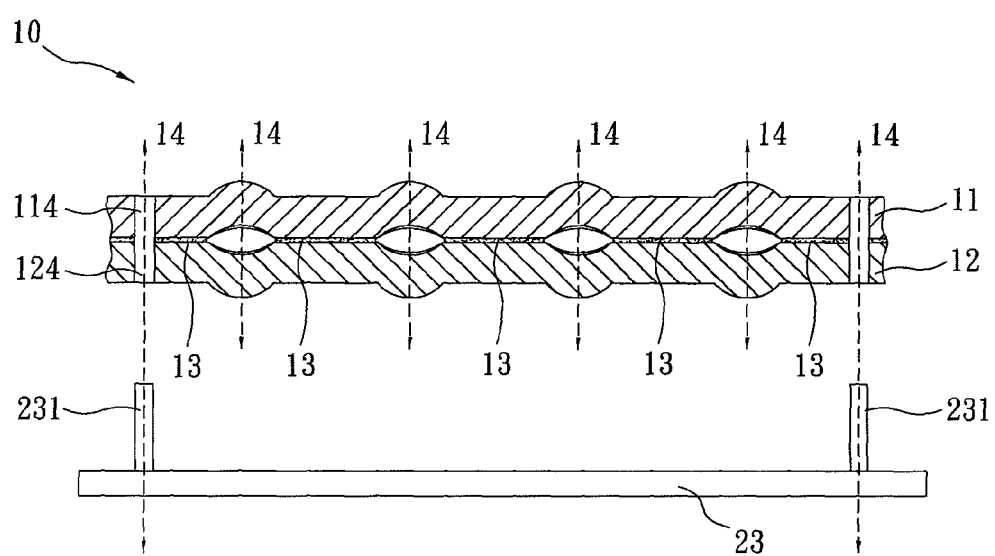
FIG. 5 is an assembly view of a further embodiment with through holes as alignment members according to the present invention.

Refer to FIG. 5, a glass lens array module 10 of this embodiment is composed of two glass lens arrays 11, 12 and four alignment members. The alignment members are four sets of through holes. Only two sets of through holes 114, 124 are shown in FIG. 5. After alignment of through holes 114, 124 of two glass lens arrays 11, 12, each optical axis 14 of two glass lens arrays 11, 12 is aligned, and then two glass lens arrays 11, 12 are connected, cured and fixed by glue 13.

Figure 6:
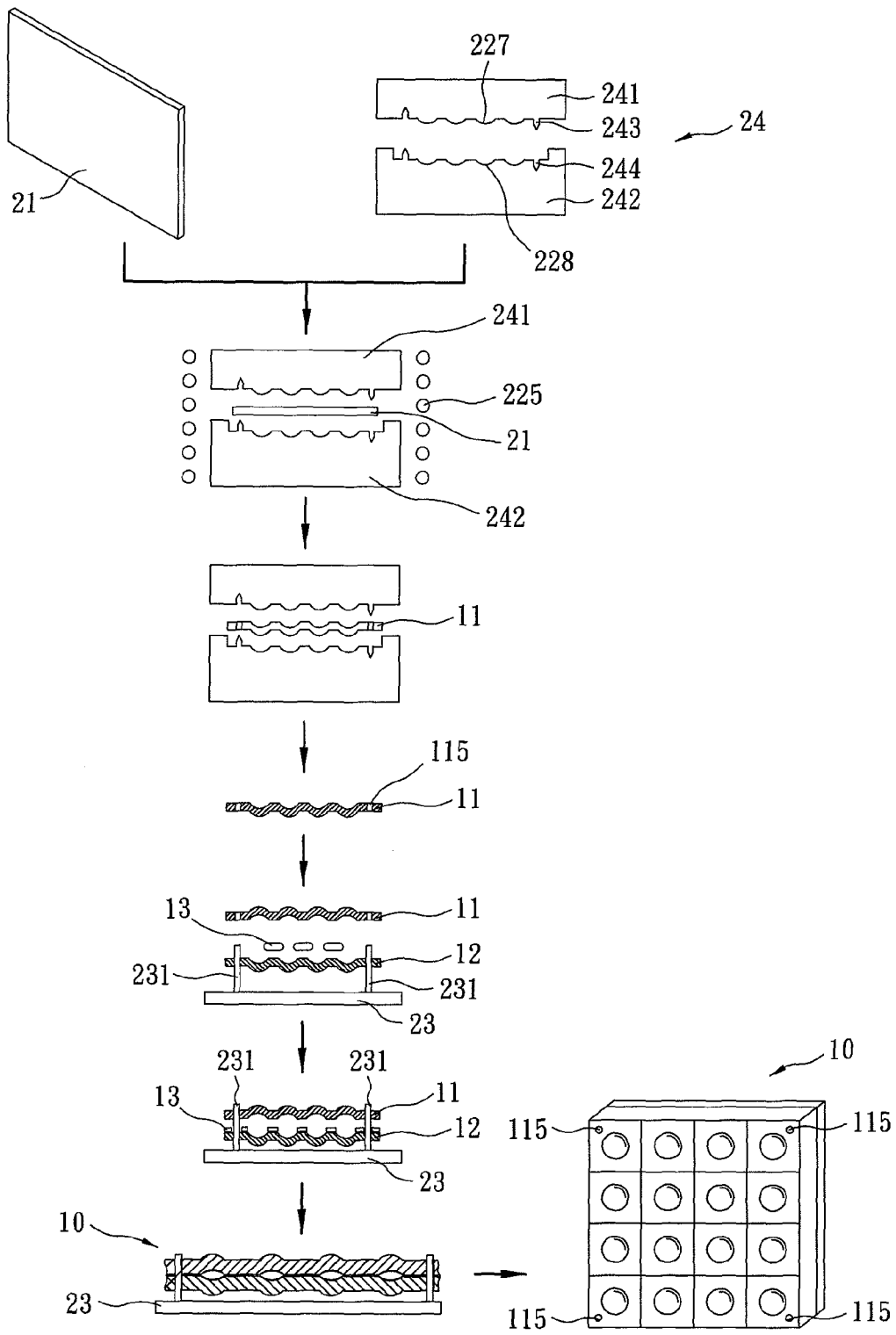
FIG. 6 are schematic drawings showing manufacturing processes of a further embodiment according to the present invention.

A manufacturing method of this embodiment as shown in FIG. 6 includes following steps:
SS1: providing a glass blank 21;
SS2: providing a mold 24 for the glass lens array 11, having an upper mold 241 and a lower mold 242 that are corresponding to each other and respectively disposed with a plurality of mold cores 227, 228 of optical glass lenses and four mold straight leaders 243 and/or mold straight sleeves 224 for forming through holes;
SS3: setting the glass blank 21 into the mold cavity formed by the upper mold 241 and the lower mold 242 so as to be heated and pressured for carrying out a molding process to form a glass lens array 11 with through holes 115 as alignment members;
SS4: repeating above steps to produce another glass lens array 12;
SS5: preparing an assembly fixture 23 disposed with at least one assembly center shaft 231;
SS6: putting the second glass lens array 12 into the assembly fixture 23 and the through hole 115 is inserted by the assembly center shaft 231; coating glue 13 on its non-optical area;
SS7: putting the first glass lens any 11 into the assembly fixture 23 and the through hole 115 is inserted by the assembly center shaft 231 for alignment;
SS8: curing the glue 13 and separating the assembly fixture 23 to form a glass lens array module 10.

Embodiment 4

Figure 7:
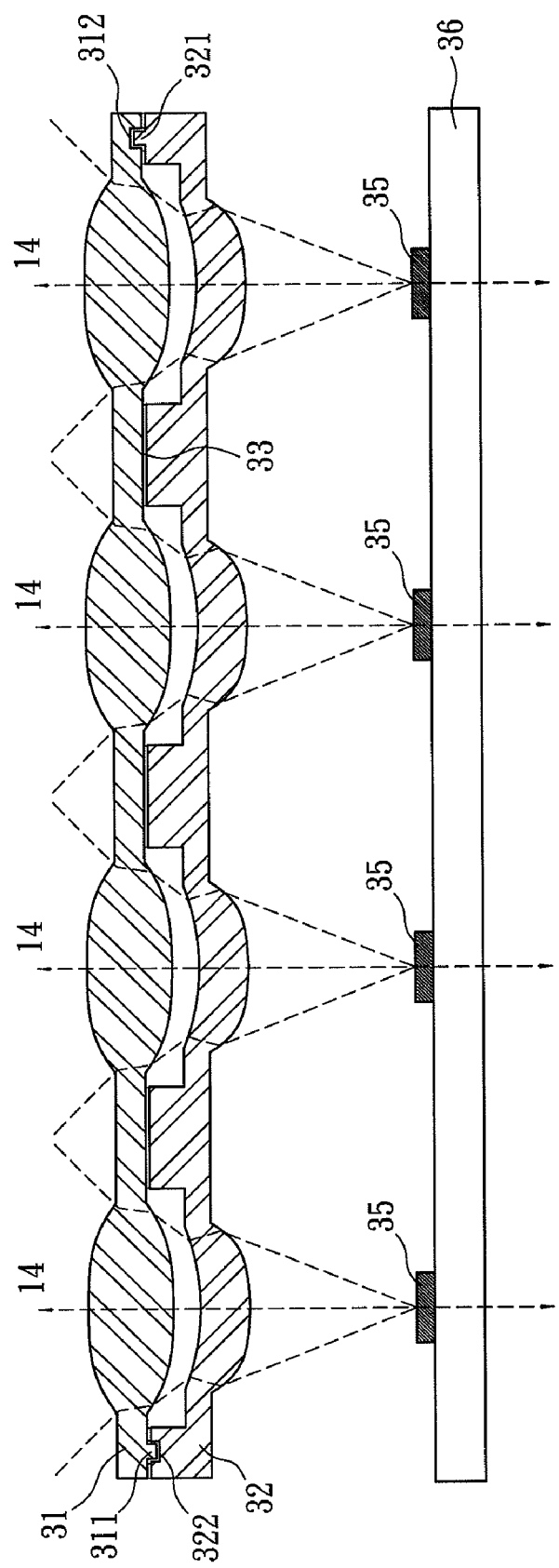
FIG. 7 is a cross sectional view of a further embodiment applied to solar energy conversion systems according to the present invention.

Refer to FIG. 7, an embodiment of a glass lens array module is applied to solar energy conversion systems. In order to increase solar energy conversion efficiency, a plurality of glass lens arrays are overlapped for use. Thus sunlight is focused on solar conversion die 35 so as to convert solar energy into power to be output through a circuit board 36. In this embodiment two glass lens arrays 31, 32 are assembled to form a glass lens array module. A first glass lens array 31 includes 16 biconvex optical areas and a second glass lens array 32 includes 16 corresponding meniscus optical areas. The optical parameters are shown in a list one. The list shows surface number of each optical surface, type, the radius of curvature of each optical surface on the optical axis, the on-axis surface spacing and lens material. In order to achieve optical light concentration effect, the optical axis 14 of each optical area of two glass lens arrays 31, 32 should be aligned and a certain distance is maintained between two optical axes 14. Moreover, on corners of the first and the second glass lens arrays 31, 32, two sets of corresponding alignment pins 311, 321 and alignment cavities 322, 312 are arranged respectively. There should be four sets of alignment members. While assembling, thermosetting glue 33 is coated on non-optical area of the second glass lens array 32 and then the first glass lens array 31 is overlapped on the second glass lens array 32. The alignment pins 311, 321 are inserted into alignment cavities 322, 312 correspondingly for alignment. Thus the optical axis 14 is aligned and a preset interval is maintained. Then the assembly is set into an oven to be heated for curing of the glue 33. A glass lens array module is formed to be applied to solar energy conversion system.

List one

| Surf # | Type | curvature R (mm) | spacing D (mm) | Lens material |
|---|---|---|---|---|
| #1 | aspheical diameter 10 mm | 34.4616 | 4.0 | BK7 Nd = 1.5168; Vd = 64.167336 |
| #2 | aspherical | −19.5377 | 0.50 | |
| #3 | spherical diameter 8.8 mm | −19.7630 | 4.0 | BK7 Nd = 1.5168; Vd = 64.167336 |
| #4 | aspherical | −6.2302 | 10.0 | |
| Solar conversion die | STANDARD | ∞ | | |

Embodiment 5

Figure 8:
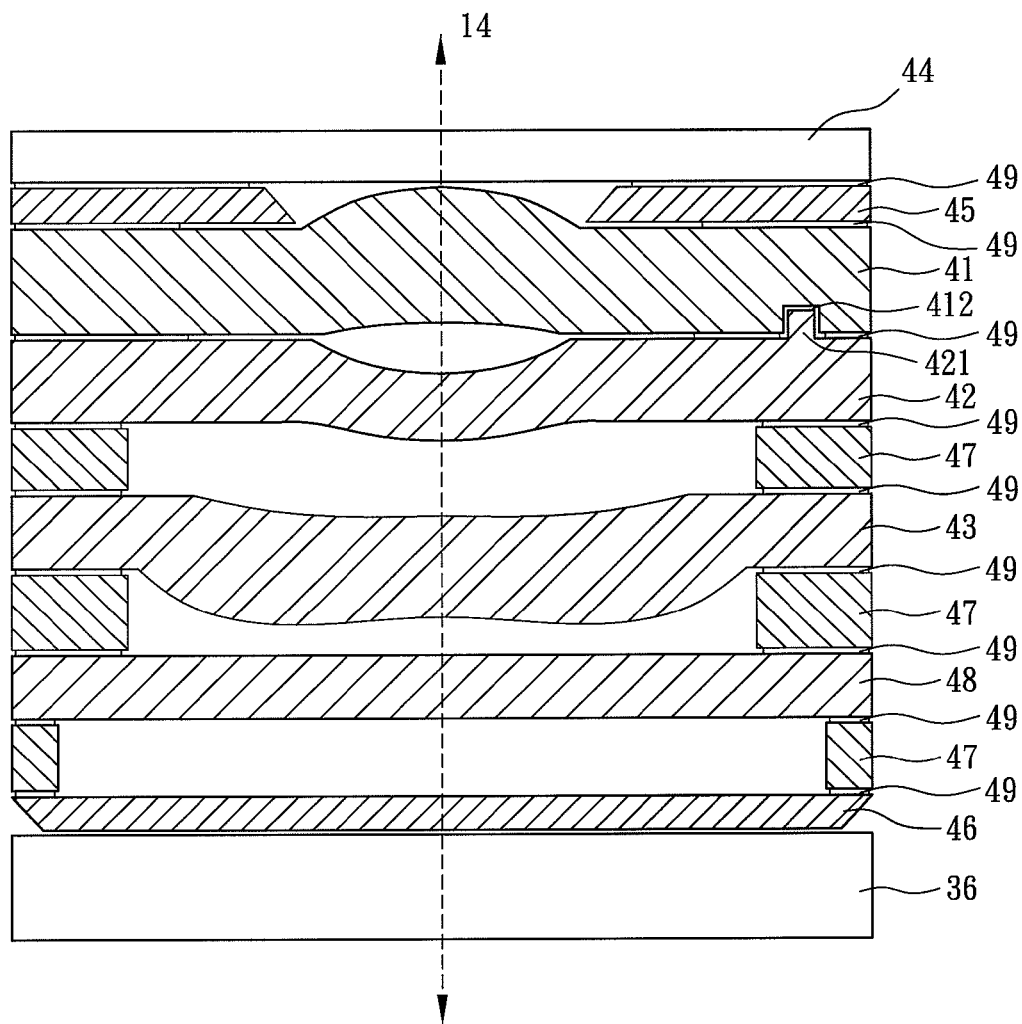
FIG. 8 is a cross sectional view of a further embodiment applied to mobile phone camera lenses according to the present invention.

Referring to FIG. 8, a glass lens array module of this embodiment is applied to mobile phone camera lenses. The glass lens array module comprises: from the object side, the glass lens array includes a meniscus first optical lens 41 whose concave surface faces to the image side, a meniscus second optical lens 42 whose convex surface faces to the image side, a M-shaped third optical lens 43 and a plurality of optical elements having a cover glass 44, an aperture 45, three spacers 47, an infrared (IR) filter 48, an image sensor 46 and a circuit board 36 are assembled. The optical parameters are shown in a list two where, the surf is denoted the optical surface number, the type is denoted aspherical optical surface, R is denoted the radius of curvature of each optical surface on the optical axis, D is denoted the on-axis surface spacing and the lens material. On the optical axis, the spacing of the image side surface of the first optical lens 41 and the objective side surface of the second optical lens 42 is 0.333 mm; the spacing of the image side surface of the second optical lens 42 and the objective side surface of the third optical lens 43 is 0.71 mm; and the spacing of the image side surface of third optical lens 43 and the objective surface of the IR filter 48 is 0.3 mm.

List two

| Surf # | Type | Curvature R (mm) | spacing D (mm) | Lens material |
|---|---|---|---|---|
| 1 (STO) aperture and convex surface of a first optical lens | aspheical | 1.0613 | 0.625417 | SCHOTT_ BAC2 |
| 2 concave surface of the first optical lens | aspherical | 2.8968 | 0.333 | |
| 3 concave surface of a second optical lens | aspherical | −1.2031 | 0.3 | OHARA_ FTM16 |
| 4 convex surface of the second optical lens | aspherical | −1.4586 | 0.71 | |
| 5 object side of a third optical lens | aspherical | 7.6865 | 0.635 | SCHOTT_ BAC2 |
| 6 image side of the third optical lens | aspherical | 3.4879 | 0.3 | |
| 7 object side of IR filter | | ∞ | 0.3 | BK7 |
| 8 image side of IR filter | | ∞ | 0.6895 | |
| Sensing surface of image sensor | | ∞ | | |

Figure 9:
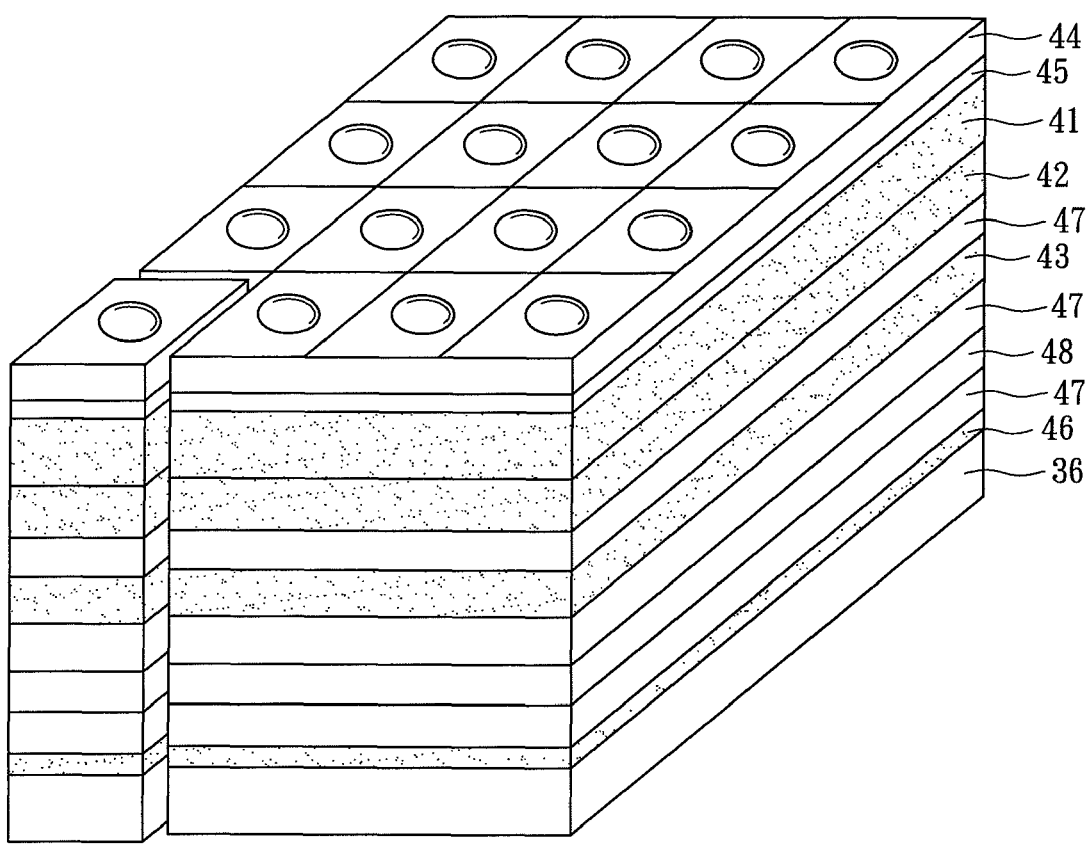
FIG. 9 is a schematic drawing showing the embodiment in FIG. 5 being cut by laser.

The manufacturing method of the glass lens array module for this embodiment is similar to that of the embodiment one. Firstly, refer to FIG. 9, a glass lens array module having 16 (4×4) first and second optical lenses 41, 42 is produced. The alignment members such as alignment cavities 412 and alignment pins 421 shown in FIG. 8 are disposed on non-optical area of the glass lens array module for alignment of the optical axis 14 of the first optical lens 41 as well as the second optical lens 42 are formed simultaneously. Then produce a plastic lens array having 16 (4×4) third optical lenses 43 by multi-cavity injection molding. As to the aperture 45 and the spacer 47, they are made in the form of plates having 16 (4×4) units 16 (4×4) optical sensors 46 are welded on preset positions of a circuit board 36. By UV-curing glue 49, assembled each plate of optical elements, the glass lens array with arrayed first optical lens 41, the glass lens array with arrayed second optical lens 42, and the plastic lens array with arrayed third optical lenses 43 in relative ordering. After being radiated in a UV oven, a glass lens array module with 16 camera lenses is formed. Then 16 camera lenses are obtained by laser cutting, as shown in FIG. 9. By such manufacturing method, 16 camera lenses are obtained each time. In each camera lens, the first optical lens 41, the second optical lens 42 and the third optical lens 43 are all aligned with the optical axis and are with a certain distance from each optical element. Thus the manufacturing cost is reduced and certain optical functions are attained.

Embodiment 6

Figure 10:
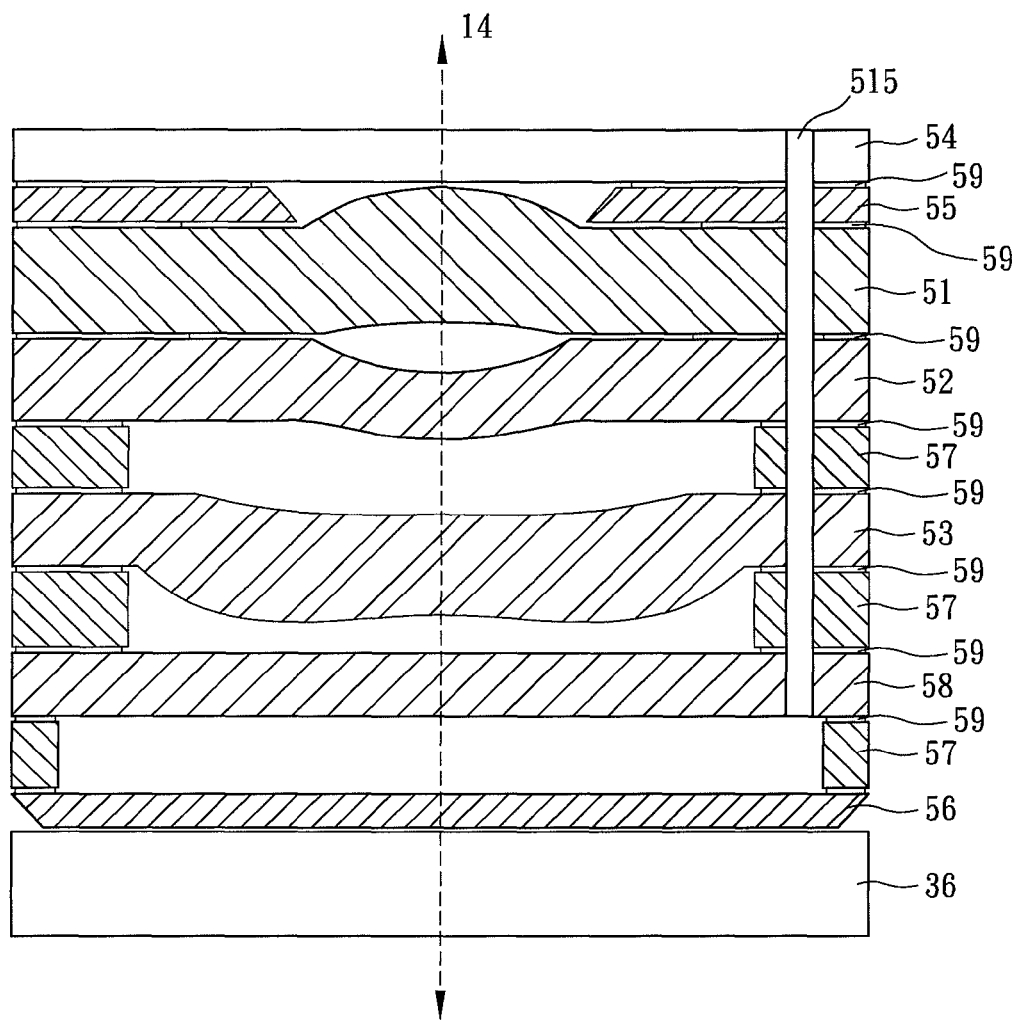
FIG. 10 is a cross sectional view of a further embodiment with through holes according to the present invention.

Refer to FIG. 10, a glass lens array module of this embodiment is applied to mobile phone camera lenses, similar to the embodiment five. The difference of this embodiment and the above one is in the alignment member. At least one through holes 515 is used in this embodiment. Similar to the embodiment one, three glass lens arrays having 16 (4×4) first optical lenses 51, second optical lenses 52 and third optical lenses 53 produced by multi-cavity glass molding. Four through holes 515 are arranged at non-optical area of four corners of each glass lens array. As to the aperture 55 and the spacer 57, they are made in the form of plates having 16 (4×4) units. Each plate is disposed with through holes 515 on corresponding positions. Each plate includes four through holes 515. In FIG. 10, there is only a through hole 515 shown. 16 (4×4) optical sensors 56 are welded on preset positions of a circuit board 36. Prepare an assembly fixture with four assembly center shafts. The through holes 515 on each plate with optical elements and glass lens arrays are inserted by the assembly center shafts (not shown in figure) of the assembly fixture. And each plate with optical elements and glass lens arrays are overlapped and assembled sequentially with one another by UV-curing glue. After being radiated in a UV oven, separate the assembly fixture, a glass lens array module with 16 camera lenses is obtained. Then the glass lens array module is assembled with the circuit board 36 welded with 16 optical sensors 56 correspondingly and is cut by laser to form 16 camera lenses.

Embodiment 7

Figure 11:
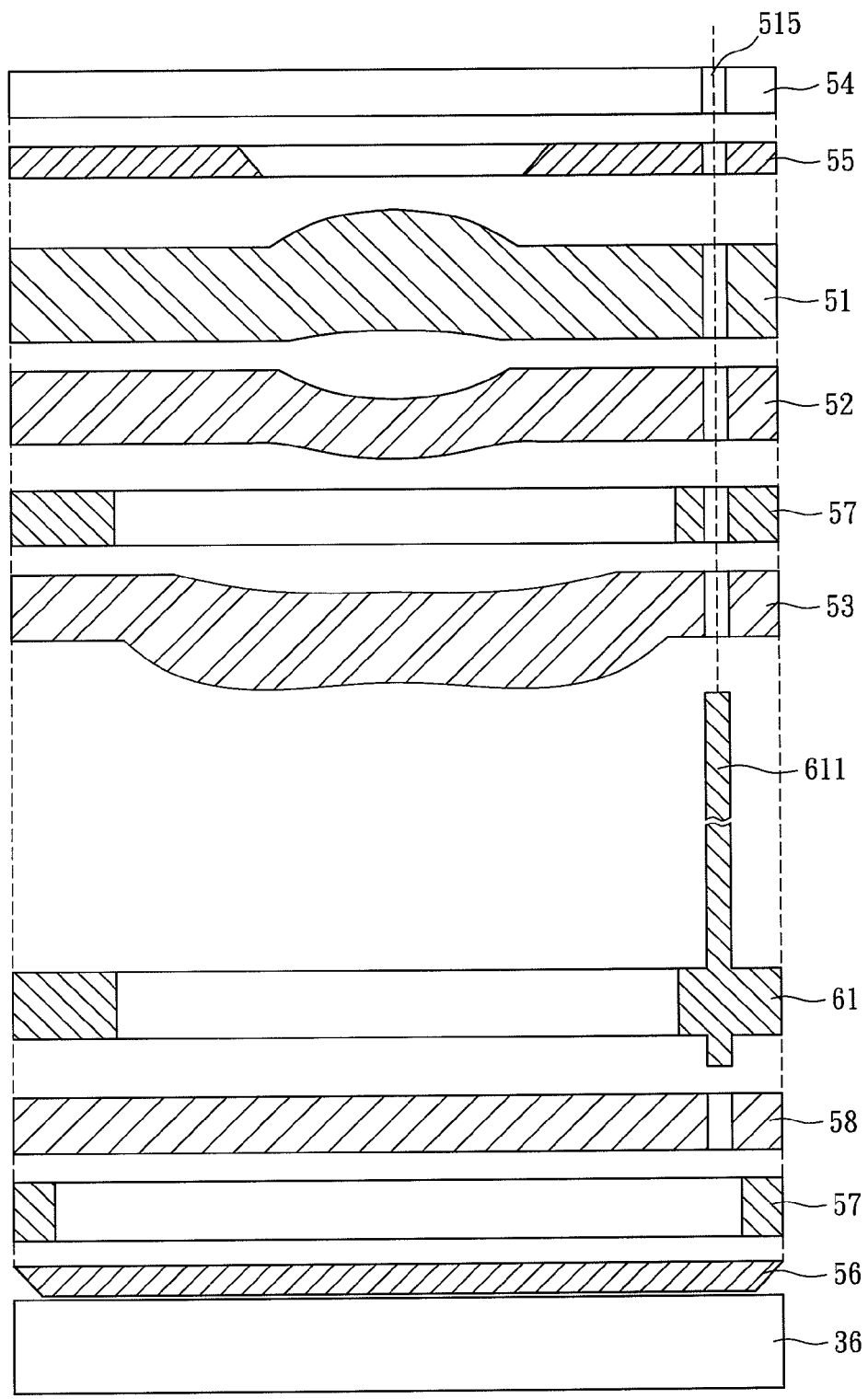
FIG. 11 is a cross sectional view of a further embodiment with alignment spacers according to the present invention.
Figure 12:
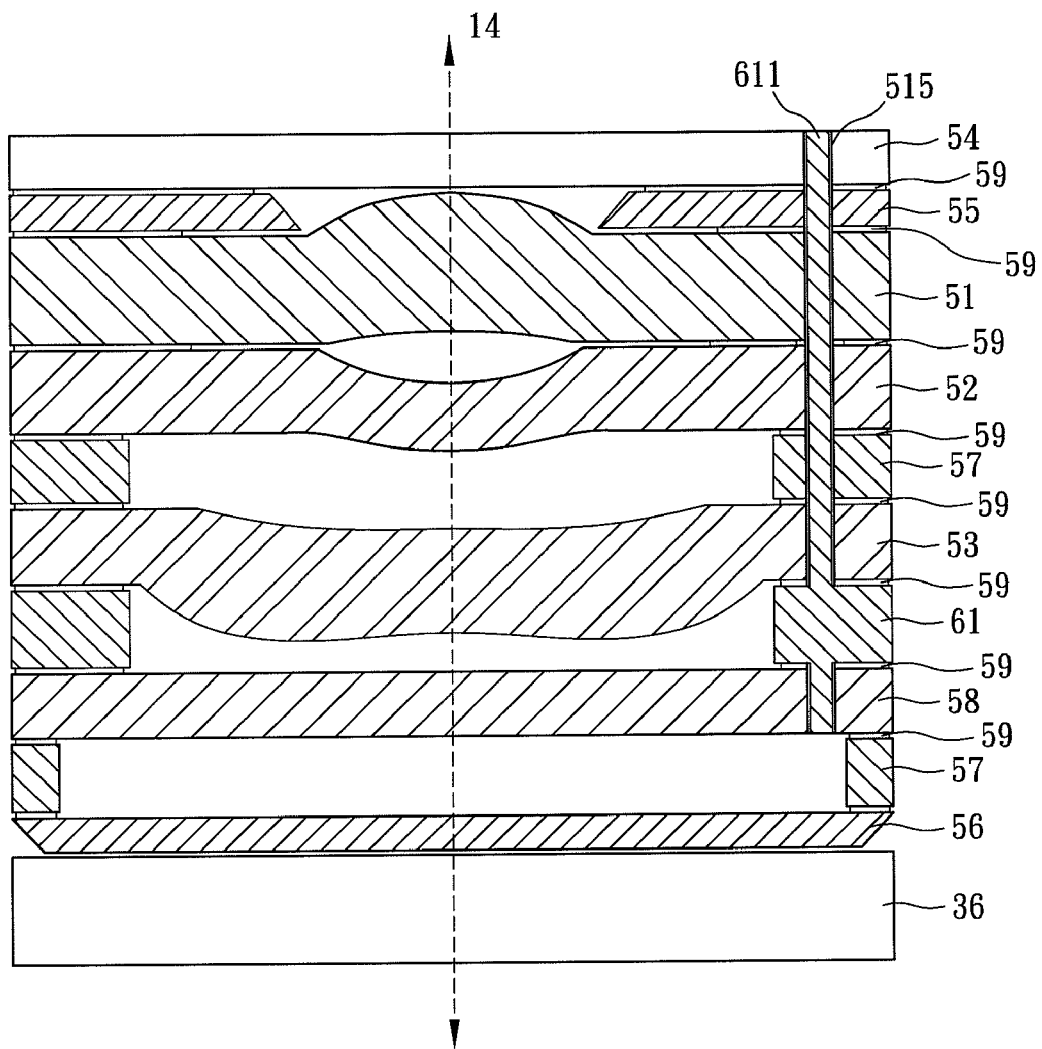
FIG. 12 is a cross sectional view of the assembly of the embodiment in FIG. 11.

Refer to FIG. 11 and FIG. 12, a glass lens array module of the embodiment is applied to mobile phone camera lenses. The manufacturing processes and functions of the embodiment are similar to those of the embodiment six. However, the present embodiment provides an alignment spacer 61 instead of the spacer 57 in the embodiment six. An alignment rod 611 corresponding to through hole of the glass lens array and each optical element is disposed on each of four corners of the alignment spacer 61. The alignment spacer 61 replaces the assembly fixture and the assembly center shafts in the embodiment six. Thus while assembling, through holes of each plate with optical elements and the glass lens array are inserted by the alignment rods 611 and then overlapped and glued in sequence for assembly and alignment.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A glass lens array module comprising: a plurality of glass lens arrays assembled and fixed by glue with a preset interval between two adjacent glass lens arrays;
   wherein each glass lens array is produced by multi-cavity glass molding to form a rectangular array that each side of the rectangular array has at least two optical glass lenses, and has an optical area including the optical glass lenses and a non-optical area surrounding and isolating each of the optical glass lenses;
   wherein the glue is dispersedly coated between the non-optical areas of the two adjacent glass lens arrays, such that the non-optical areas of the two adjacent glass lens arrays are bonded with each other;
   wherein at least three alignment members are disposed on a peripheral of the non-optical area of each glass lens array and the alignment members of two adjacent assembled glass lens arrays are connected and assembled with each other so as to make the optical areas of each of the two adjacent assembled glass lens arrays are aligned with an optical axis.

2. The module as claimed in claim 1, wherein the alignment members of two adjacent assembled glass lens arrays are composed of an alignment pin and an alignment cavity.

3. The module as claimed in claim 2, wherein the alignment pin is columnar, and the alignment cavity is a corresponding columnar hole.

4. The module as claimed in claim 2, wherein the alignment pin is a cone and the alignment cavity is a corresponding conical hole.

5. The module as claimed in claim 1, wherein the alignment members of two adjacent assembled glass lens arrays are through holes that is inserted by an assembly center shaft of an assembly fixture so as to make the two adjacent assembled glass lens arrays align with an optical axis.

6. The module as claimed in claim 1, wherein the glass lens array module further includes a spacer that is assembled and fixed with adjacent glass lens array by glue so as to generate a preset interval between the two adjacent glass lens arrays.

7. The module as claimed in claim 5, wherein an alignment spacer is disposed with an alignment rod that inserts into the through holes so as to make the two adjacent assembled glass lens arrays align with an optical axis.

8. The module as claimed in claim 1, wherein the glue is thermosetting and can be cured by heating for fixing.

9. The module as claimed in claim 1, wherein the glue is ultra-violet (UV) curing and can be cured by UV radiation for fixing.

10. The module as claimed in claim 1, wherein the glass lens array module further includes optical elements; the optical element is selected from an aperture, a cover glass, an infrared lens, an image sensor, a solar conversion die, a circuit board or their combination.

11. A manufacturing method of glass lens array module comprising the steps of:
   providing a glass blank;
   providing an upper mold and a lower mold for forming a glass lens array, wherein the upper and lower molds respectively are disposed with a plurality of mold cores of optical surfaces and mold pins and/or mold bushings of alignment members;
   setting the glass blank into a mold cavity formed by the upper mold and the lower mold so as to be heated and pressured for carrying out a molding process to mold a first glass lens array having a plurality of optical area as well as a plurality of alignment members disposed on non-optical area;
   repeating above steps to produce a second glass lens array;
   coating glue on the non-optical area of the first glass lens array and of the second glass lens array;
   assembling the first glass lens array and the second glass lens array by the alignment members;
   curing the glue to form a glass lens array module.

12. The method as claimed in claim 11, wherein the step of assembling the first glass lens array and the second glass lens array comprising: a spacer is disposed between the non-optical area of the first glass lens array and the non-optical area of the second glass lens array, the first glass lens array and the second glass lens array are assembled on the two side of the spacer by glue.

13. The method as claimed in claim 12, further comprising: at least one optical element is overlapped and assembled with the glass lens array by glue.

14. A manufacturing method of glass lens array module comprising the steps of:
   providing a glass blank;
   providing an upper mold and a lower mold for forming a glass lens array, and the upper and lower molds respectively disposed with a plurality of mold cores of optical surfaces, and mold straight leaders and/or mold straight sleeves for forming through holes;
   setting the glass blank into mold cavity formed by the per mold and the lower mold so as to be heated and pressured for carrying out a molding process to mold a first glass lens array having a plurality of optical area as well as at least one through hole disposed on non-optical area;
   repeating above steps to produce a second glass lens array;

putting the second glass lens array into an assembly fixture with at least one assembly center shaft, and the through hole of the second glass lens array is inserted by the assembly center shaft coating glue on the non-optical area of the second glass lens array;

putting the first glass lens array into the assembly fixture, and the through hole of the first glass lens is inserted by the assembly center shaft for alignment; and curing the glue and releasing the assembly fixture to form a glass lens array module.

15. The method as claimed in claim 14, wherein the step of assembling the first glass lens any and the second glass lens array comprising: a spacer is disposed between the non-optical area of the first glass lens array and the non-optical area of the second glass lens array, the first glass lens array and the second glass lens array are assembled on the two side of the spacer by glue.

16. The method as claimed in claim 14, further comprising: at least one optical element with corresponding through hole is provided so that the optical element and the glass lens array are overlapped and assembled by the assembly fixture and glue.

17. A manufacturing method of glass lens array modules comprising the steps of:

providing a glass blank;

providing an upper mold and a lower mold for forming a glass lens array, and the upper and lower molds respectively disposed with a plurality of mold cores of optical surfaces, and mold straight leaders and/or mold straight sleeves for forming through holes;

setting the glass blank into mold cavity formed by the upper mold and the lower mold so as to be heated and pressured for carrying out a molding process to mold a first glass lens array having a plurality of optical area as well as at least one through hole disposed on non-optical area;

repeating above steps to produce a second glass lens array;

producing an alignment spacer disposed with at least one alignment rod;

putting the second glass lens array into the alignment spacer and the through hole of the second glass lens array is inserted by the alignment rod;

coating glue on the non-optical area of the second glass lens array;

putting the first glass lens array into the alignment spacer and the through hole of the first glass lens is inserted by the alignment rod for alignment; and curing the glue to form a glass lens array module.

18. The method as claimed in claim 17, wherein the step of assembling the first glass lens array and the second glass lens array comprising: an alignment spacer is disposed between the non-optical area of the first glass lens array and the non-optical area of the second glass lens array, the first glass lens array and the second glass lens array are assembled on the two side of the alignment spacer by glue.

19. The method as claimed in claim 17, further comprising: at least one optical element with corresponding through hole is provided so that the optical element and the glass lens array are overlapped and assembled by the insertion of the alignment rod of the alignment spacer into the through hole and glue.

* * * * *